United States Patent
Yokohata et al.

(10) Patent No.: US 7,369,341 B2
(45) Date of Patent: May 6, 2008

(54) HEAD FLYING HEIGHT MEASURING APPARATUS IN MAGNETIC STORAGE DEVICE

(75) Inventors: Toru Yokohata, Kawasaki (JP); Takahiro Imamura, Kawasaki (JP); Atsuo Iida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/476,584

(22) Filed: Jun. 29, 2006

(65) Prior Publication Data

US 2007/0230013 A1  Oct. 4, 2007

(30) Foreign Application Priority Data

Mar. 30, 2006 (JP) .............................. 2006-096031

(51) Int. Cl.
*G11B 27/36* (2006.01)
*G11B 21/02* (2006.01)

(52) U.S. Cl. .......................................... 360/31; 360/75

(58) Field of Classification Search ..................... None
See application file for complete search history.

(56) References Cited

U.S. PATENT DOCUMENTS

| | | | |
|---|---|---|---|
| 4,777,544 A | 10/1988 | Brown et al. | |
| 5,410,439 A | 4/1995 | Egbert et al. | |
| 6,894,854 B1 * | 5/2005 | Carlson et al. | 360/31 |
| 2005/0152055 A1 * | 7/2005 | Biskeborn | 360/31 |

FOREIGN PATENT DOCUMENTS

| | | |
|---|---|---|
| JP | 5-20635 | 1/1993 |
| JP | 2004-14092 | 1/2004 |

OTHER PUBLICATIONS

B. Liu, et al; "Tribo-Magnetics and Nanometer Spaced Head-Disk Systems;" *IEEE Transactions on Magnetics*; vol. 37; No. 2; Mar. 2001; pp. 918-923.

* cited by examiner

*Primary Examiner*—Andrew L. Sniezek
(74) *Attorney, Agent, or Firm*—Kratz, Quintos & Hanson, LLP (57) ABSTRACT

Firstly, in order to check the noise level of a device, DC erasure is applied to a magnetic recording medium and the magnetic recording medium is read. Then, a test signal including a first order component and a third order harmonic frequency is written into the magnetic recording medium. The written test signal is read and Fourier transform is applied to the read signal to obtain the respective amplitude of the first order and third order harmonic components. Then, it is determined whether the amplitude of the third order harmonic component is sufficiently large compared with the obtained noise level. If the amplitude is sufficiently large, the flying height of the head is estimated using both the first order and third order harmonic components. If the amplitude is not sufficiently large, the flying height of the head is estimated using only the first order component.

10 Claims, 6 Drawing Sheets

HEAD FLYING HEIGHT MEASURING APPARATUS IN MAGNETIC STORAGE DEVICE

BACKGROUND OF THE INVENTION

1. Field of the Invention

The present invention relates to a magnetic storage device, more particularly a hard magnetic disk device, with a magnetic storage medium and a head.

2. Description of the Related Art

Magnetic spacing between a head and a medium is measured in a magnetic storage device, more particularly a hard magnetic disk device in order to check whether its operation is normal. In prior arts disclosed by patent references 1 through 3, a signal including a plurality of signal components each with a different frequency component is recorded on a medium, and by obtaining its reproduction signal, magnetic spacing between a head and a medium is measured. In this case, which frequencies are used can be theoretically determined arbitrarily. However, actually, in many cases, frequencies which are within a range close to a frequency used in the device and a frequency which is equal to three times as high as the said frequency are selected and the flying height of the head is estimated using a component amplitude ratio corresponding to these two frequency components in the reproduction signal.

It is known that in this case, as the flying height increases, the amplitude of the higher frequency component (hereinafter called "third order component") decreases at a higher rate than the amplitude of the lower frequency component (hereinafter called "first order component").

Figure 1:
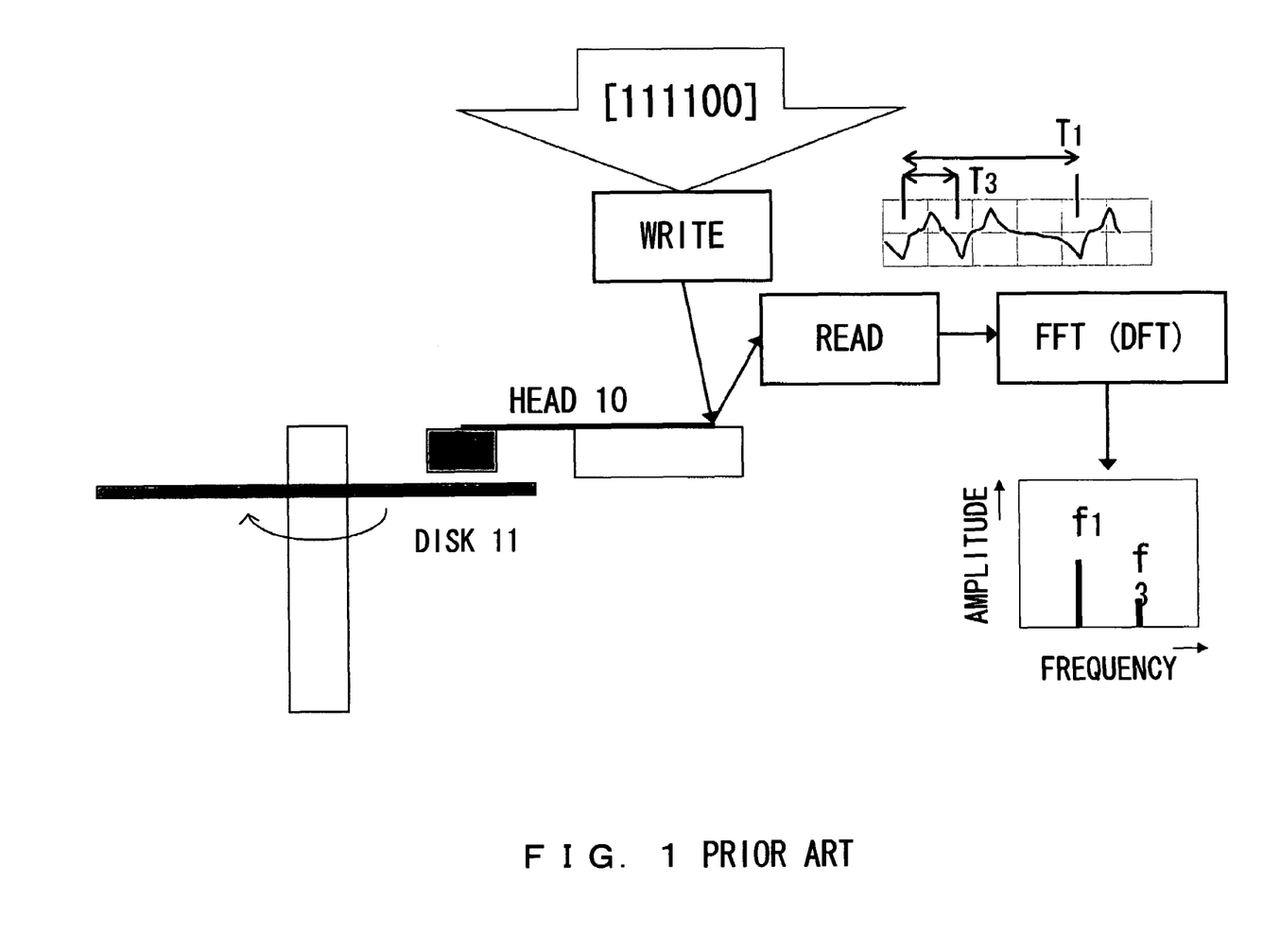
FIG. 1 shows the outline of a method for measuring the flying height of a head.

FIG. 1 roughly shows how to measure the flying height of a head.

A write instruction of a digital signal in which [111100] is repeated is inputted to a magnetic storage device composed of a head 10 and a disk 11. After being written into the disk 11, this signal is read using the head 10. The read signal is Fourier-transferred and its frequency component is extracted. The reproduction signal read in this way contains much first order and third order components of a specific frequency. The flying height of the head 10 can be estimated using the respective amplitude of the first order and third order components.

Patent reference 1: Japanese Patent Application Publication No. H7-1618

Patent reference 2: Japanese Patent No. 2711207

Patent reference 3: Japanese Patent Application Publication No. 2004-14092

If the actual flying height is greatly higher than the predetermined value, the third order component should be greatly small theoretically. However, technically the third order component cannot be measured, which-is equal to or less than a noise level. Therefore, according to the publicly known method, the flying height is wrongly estimated lower than the actual flying height due to the influence of noise. This error can be never detected by monitoring only the component amplitude ratio corresponding to the two frequency components.

SUMMARY OF THE INVENTION

It is an object of the present invention to provide a head flying height measuring device capable of estimating a more accurate flying height.

The measuring device of the present invention comprises a test signal writing unit for writing a test signal including a plurality of frequencies into a magnetic storage medium, a reading unit for reading the written test signal, an amplitude acquisition unit for obtaining the respective amplitude of the frequency components and a flying height estimation unit for estimating the flying height of a head without using a frequency component whose amplitude is smaller than the predetermined value if the amplitude is smaller than the predetermined value.

According to the present invention, a head flying height measuring device capable of more accurately measuring/estimating the flying height of a head can be realized.

DESCRIPTION OF THE PREFERRED EMBODIMENTS

In the preferred embodiment of the present invention, a magnetic storage device or a magnetic recording-related inspection device may monitor the amplitude of a high frequency component by a method for measuring magnetic spacing using a signal with a plurality of component frequencies, and if the amplitude is below a predetermined level, the calculated magnetic spacing estimation value is not adopted.

Alternatively, a magnetic storage device or a magnetic recording-related inspection device may monitor the amplitude of a third order component using a method for measuring magnetic spacing by a third order harmonic method using first order and third order frequency components, and if the amplitude is below a predetermined level, the calculated magnetic spacing estimation value is not adopted.

Alternatively, a magnetic storage device or a magnetic recording-related inspection device may monitor the amplitude of a high frequency component by a method for measuring magnetic spacing using a signal with a plurality of frequency components, and if the amplitude is below a predetermined level, only the calculated magnetic spacing estimation value based on the reliable amplitude of a low frequency component is adopted.

Even when the magnetic spacing estimation value can be obtained by a magnetic storage device with high recording density represented by the latest model and a model under development in a measuring device for estimating the flying height of a head by measuring a conventional spacing, sometimes only an unreliable value can be obtained.

If unreliable value is used without knowing that it is unreliable, many bad influences are caused. For example, an error which does not actually occur is wrongly detected to issue an alarm and as a result, a device is wastefully replaced. Alternatively, a component which is actually good is wrongly determined to be bad. As a result, a lot of components are discarded and destroys the natural environment. If the preferred embodiment of the present invention is used, these bad influences can be prevented since an unreliable value can be correctly discarded and a reliable value can be adopted.

In the following description, it is assumed that when a write signal used to measure magnetic spacing is read, the read reproduction signal mainly contains first order and third order components. However, the present invention is not limited to this and is similarly applicable only if the signal contains an arbitrary low frequency component and a high frequency component.

As described in FIG. 1, when measuring the flying height of a head or magnetic spacing, a signal pattern including two waves of a first order component and a third order harmonic component are written onto a magnetic medium using a magnetic head and the respective amplitude of the two waves of the first order component and the third order harmonic component are extracted from the read signal.

It is assumed that spacing is calculated using each of the respective amplitude of the first order component and third order harmonic component as follows, which is also disclosed by patent reference 3.

$$\{(d+a) - (d+a)_{ref}\} = \frac{3\lambda}{4\pi} \ln \frac{(V_1/V_3)}{(V_1/V_3)_{ref}} \qquad (1)$$

In equation (1), d, a, $V_1$, $V_3$ and a symbol with ref attached indicate magnetic spacing, transition width, the amplitude of a first order component, the amplitude of a third order component and the reference value of each value, respectively. $\lambda$ is the wavelength of a wave of a magnetic variation on the medium, of a write signal. Although a value calculated here is a value (d+a) in the case where the reference value is 0, the value (d+a) in the case of an arbitrary reference value can be also obtained if the reference value is predetermined. Since a theoretical expression for calculating "a" is already known, a value "a" can be also calculated. If an expression for converting magnetic spacing into the flying height of a head is obtained taking into consideration the thickness of the magnetic layer, protection layer or the like, of a magnetic recording device, the flying height of a head can be estimated according to information obtained by equation (1).

Figure 2:
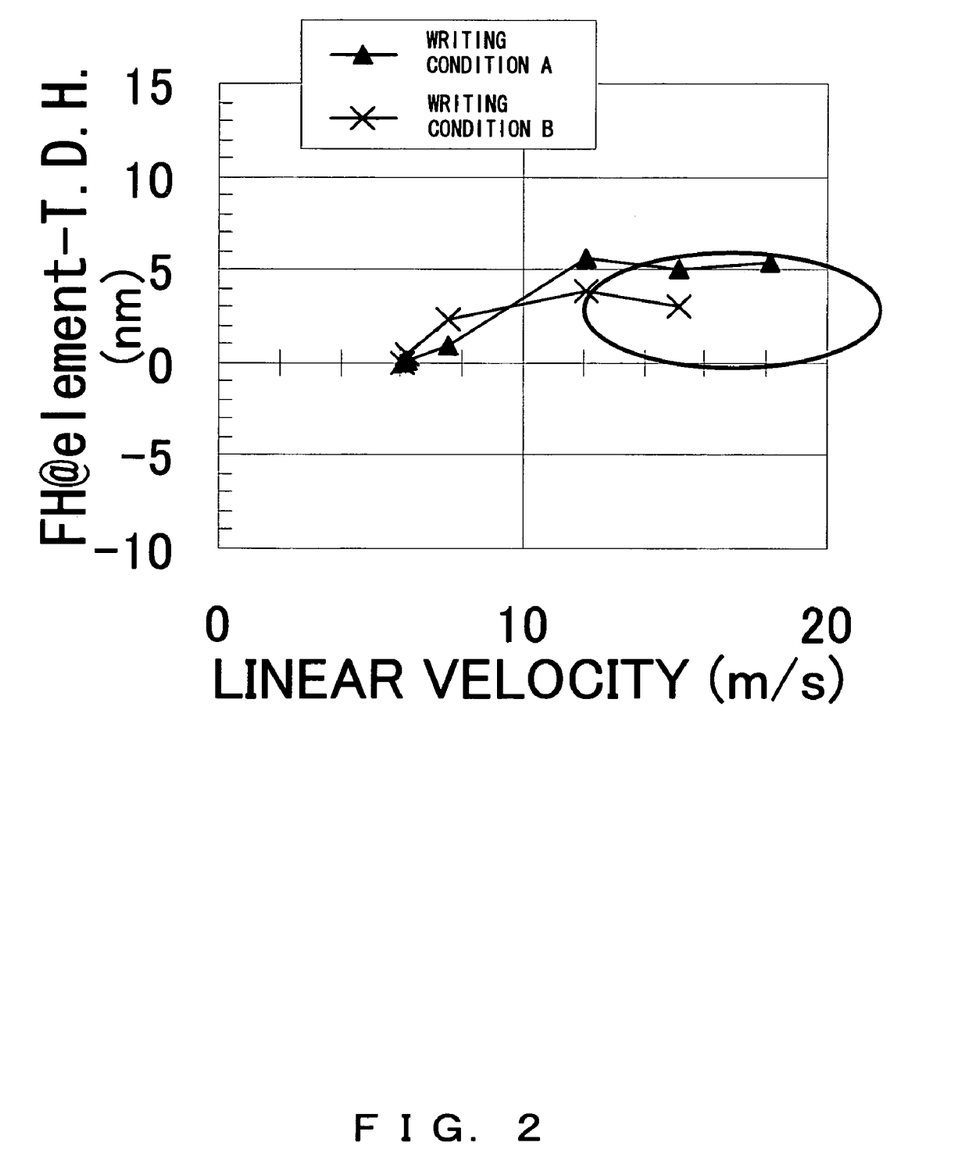
FIG. 2 shows a problem in the case where the flying height of a head is measured by using both first order and third order components.

FIG. 2 shows a problem in the case where the flying height of a head is measured by using both first order and third order components.

In FIG. 2, the relationship between the relative velocity between a head and a medium and spacing is computed using two measuring conditions (conditions of a write signal). In FIG. 2, the horizontal axis is the relative linear velocity between ahead and a disk. In this case, it must be noted that the velocity is linear velocity and is not angular velocity. Even when angular velocity is constant, linear velocity increases as the head further goes the outside of the disk. The vertical axis in FIG. 2 indicates the flying height of the head at the position of a writing/reading device where the space between the head and the disk cannot be further narrowed, based on the position of the writing/reading device.

In FIG. 2, a condition A indicates a case where a write signal is written in a fairly good S/N ratio condition. A condition B indicates a case where a write signal is written in a fairly bad S/N ratio condition. If the write signals in both cases are read and the flying height of the head is estimated, as shown in FIG. 2, abnormal data occurs when the linear velocity is high. Specifically, essentially the estimated flying height of the head must increase in proportion as the linear velocity increases. However, in a plotted portion enclosed by an ellipse in FIG. 2, the linearity is destroyed and abnormal data occurs. In other words, although magnetic spacing (or the flying height of the head) is expected to monotonously increase against velocity across the entire measured velocity area, the magnetic spacing (or the flying height of the head) does not monotonously increase.

Figure 3A:
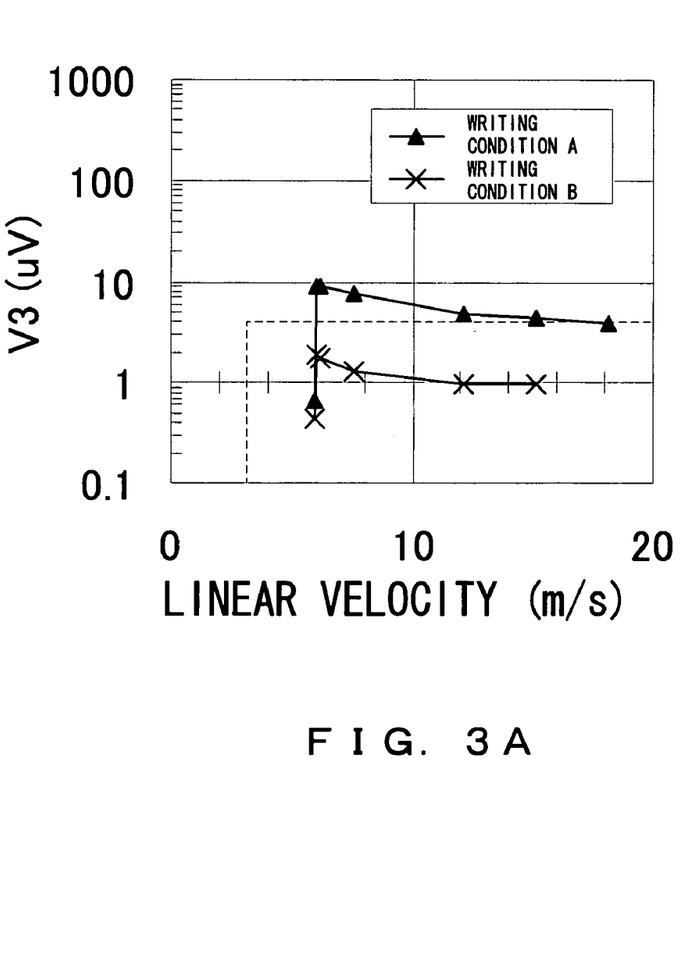
FIGS. 3A and 3B are graphs in which the respective amplitude of the first order and third order components in the measurement shown in FIG. 2 is plotted.
Figure 3B:
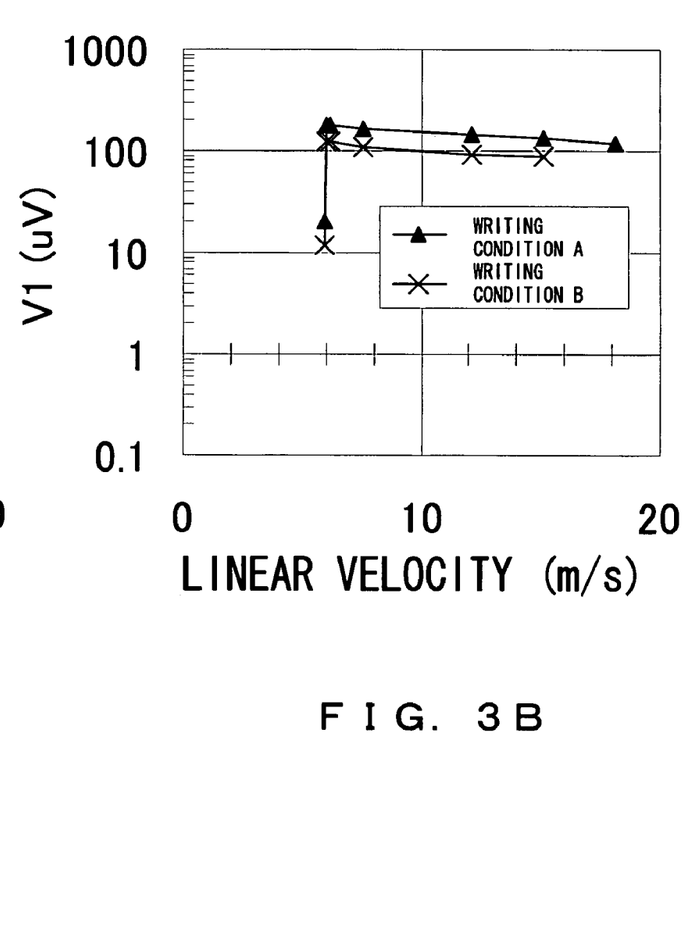

FIGS. 3A and 3B are graphs in which the respective amplitude of the first order and third order components in the measurement shown in FIG. 2 is plotted.

FIGS. 3A and 3B show the values $V_3$ (FIG. 3A) and $V_1$ before being substituted to equation (1). In this case, the value $V_3$ is fairly lower than $V_1$, and when the value $V_3$ is below the four times the noise level (approximately 1.15 uV), abnormal data occurs in FIG. 2. In this case, the noise level is similarly measured by reading the medium surface to which the DC (direct current) erasure is applied. Thus, noise levels generated from all the circuits of the magnetic storage device can be known. In this case it is assumed that the noise level is approximately 1.15 uV, this should vary for each single magnetic storage device and also vary depending on its measuring environment. Although it is determined that the occurrence condition of abnormal data in FIG. 2 is when the value $V_3$ is below the four times the noise level, this is estimated only in some experiment, and generally it can be said it is when the value $V_3$ becomes below the several times the noise level. In the present invention, the value $V_3$ is not limited to the four times the noise level. Furthermore, the erasure method is not limited within DC erasure technique. In a perpendicular magnetic recording device, AC (alternate current) erasure technique is commonly used.

According to the spacing calculation method using a Wallace relationship expression, mentioned in patent reference 1, the size of magnetic spacing can be calculated using either the $V_3$ or $V_1$. The calculation expression can be as follows.

$$\{(d+a) - (d+a)_{ref}\} = \frac{\lambda}{2\pi} \ln \frac{V}{V_{ref}} \qquad (2)$$

In equation (2), the meaning of each symbol is the same as that in equation (1). However, V is the amplitude of an arbitrary component of a write signal written onto the disk medium.

Figure 4A:
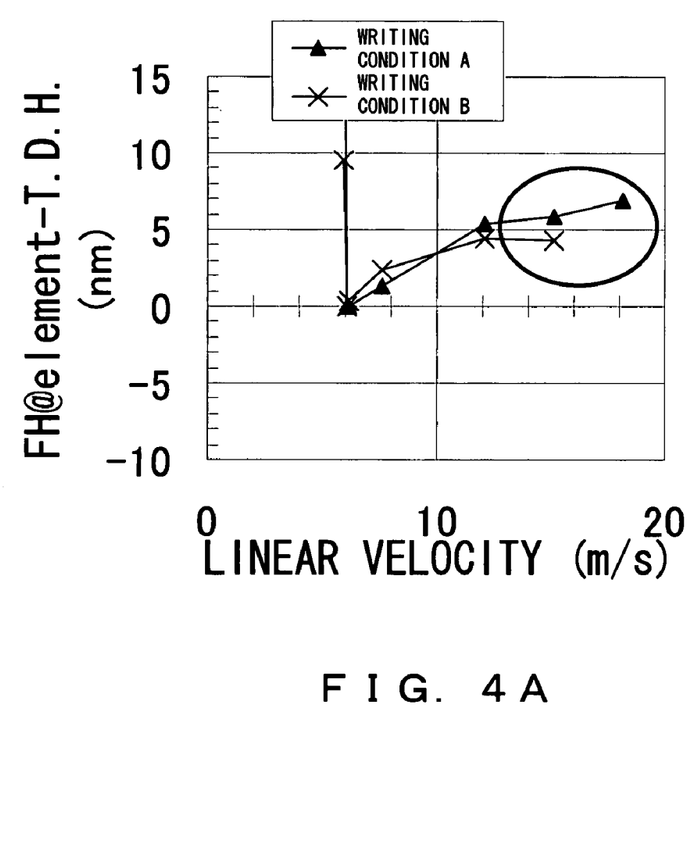
FIGS. 4A and 4B show the flying height of a head against linear velocity, obtained using one component of a write signal.
Figure 4B:
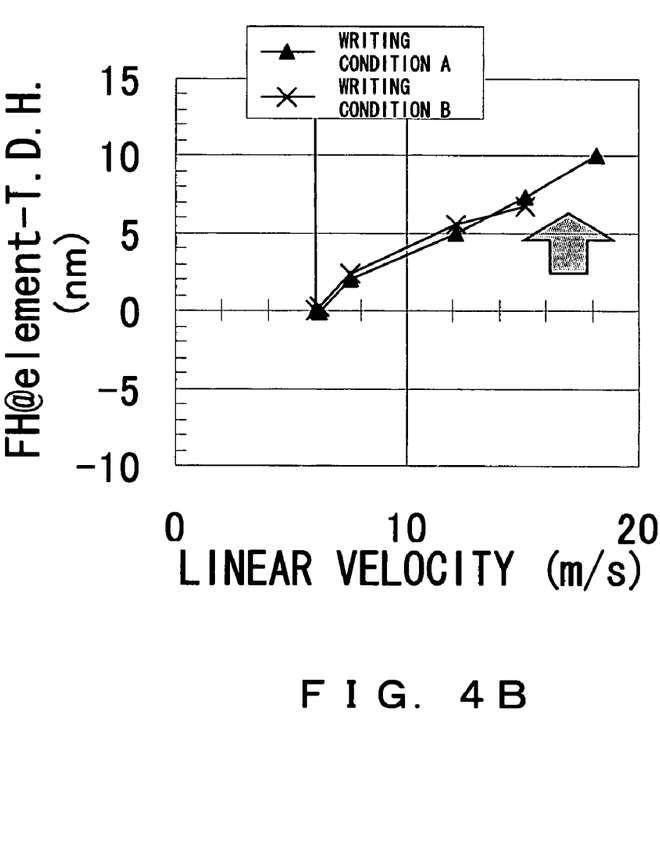

FIGS. 4A and 4B show the flying height of a head against linear velocity, obtained using only one component of a, write signal. FIGS. 4A and 4B show the flying heights of a head, obtained by using a third order component and a first order component, respectively. The vertical and horizontal axes and conditions A and B in FIG. 4 are the same as those in FIG. 2.

There is abnormal data (not linearly monotonously increasing) at the high speed under the condition A and condition B in the calculation result (FIG. 4A) based on only the amplitude $V_3$ of the third order component, as in FIG. 2. But there is no same abnormal data as in FIG. 2 in the calculation result (FIG. 4B) based on only the amplitude $V_1$ of the first order component (correctly monotonously increasing). Specifically, when using the amplitude of a third order component which is equal to or less than the about four times the noise level, the calculated flying height of the head becomes abnormal. However, when calculating the flying height of the head using the amplitude of a first order component which is larger than the about four times the noise level, a correct value can be obtained.

In this way, according to a method for determining data to be discarded (unreliable), using the noise level in the measuring system as a reference and always estimating magnetic spacing (or the flying height of a head) using only data not to be discarded (reliable), magnetic spacing can be always correctly estimated.

You may consider that magnetic spacing (or the flying height of a head) should be estimated using only a first order component from the beginning if there are cases where a third order harmonic component is not reliable. However, in actual operation, usually high estimation accuracy can be obtained if both a first order component and a third order harmonic component are used. If it is determined whether a third order harmonic component is reliable, and magnetic spacing (or the flying height of a head) is estimated using only a reliable third order harmonic component by discarding an unreliable value, the overall estimation accuracy can be always maintained high, which is convenient.

In the above description, a signal pattern including two waves of a first order component and a third order harmonic component is used. However, the similar tendency can also be obtained by using a signal pattern including two waves with different wavelengths and their respective amplitude, instead of limiting to the signal pattern including two waves of a first order component and a third order harmonic component and their respective amplitude. For example, it can be a repeated pattern [11 . . . ] or the like.

Figure 5:
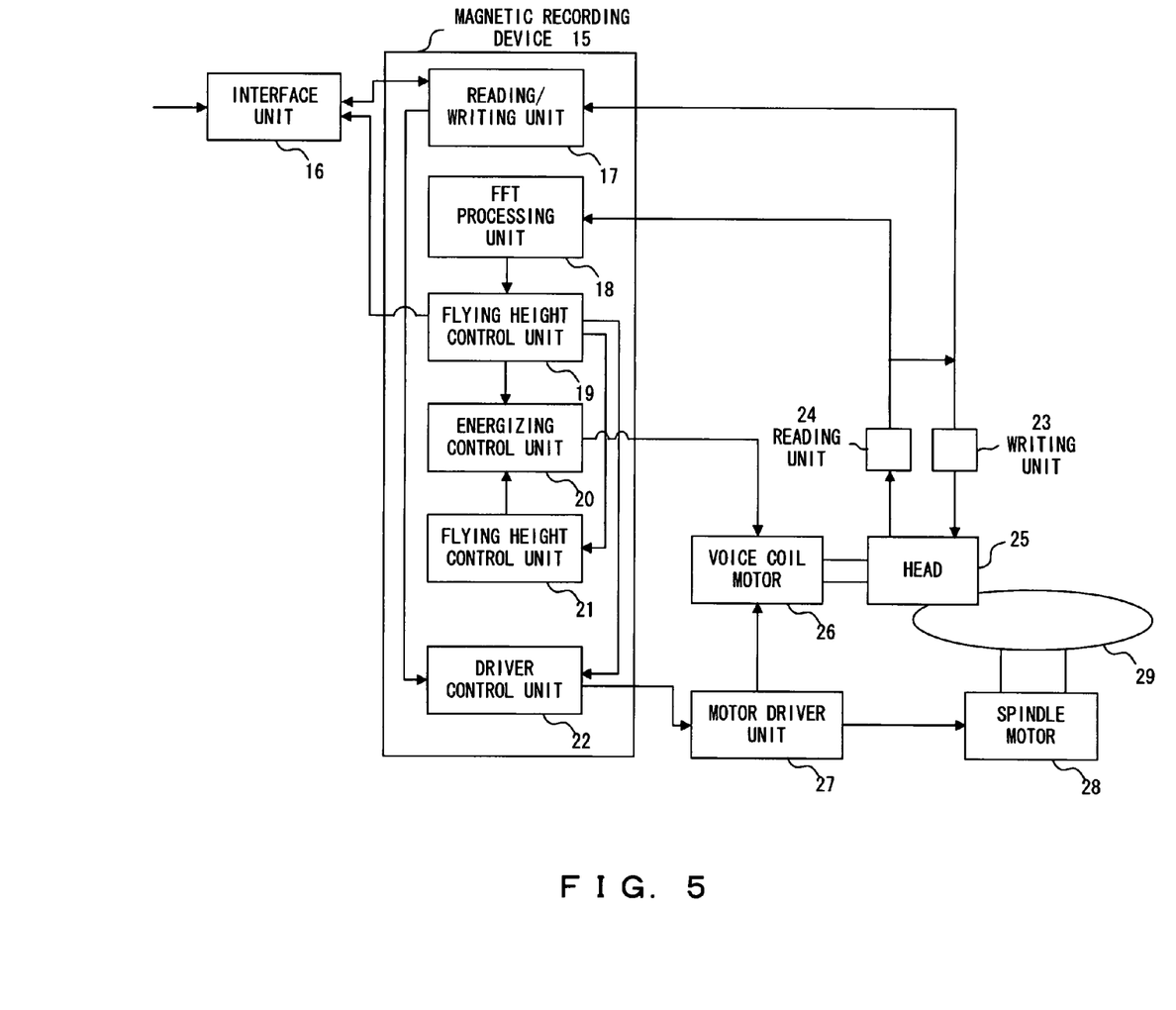
FIG. 5 shows the configuration of a magnetic recording device to which the preferred embodiment of the present invention is applied.

FIG. 5 shows the configuration of a magnetic recording device to which the preferred embodiment of the present invention is applied.

To a magnetic recording device 15, a read/write instruction is inputted via an interface unit 16. A reading/writing processing unit 17 interprets the instruction inputted via the interface unit 16 to write/read data into/from a magnetic recording medium (disk) 29. When writing data into the magnetic recording medium 29, the reading/writing processing unit 17 transmits write data to a writing unit 23, and also a driver control unit 22 controls a spindle motor 28 and a voice coil motor 26 to actually write the data. The driver control unit 22 controls a motor driver unit 27 for driving the voice coil motor 26 and spindle motor 28. The data transmitted from the reading/writing processing unit 17 to the writing unit 23 is written into the magnetic recording medium 29 via a head 25. The head 25 is driven by the voice coil motor 26. The magnetic recording medium 29 is driven by the spindle motor 28.

When reading data from the magnetic recording medium 29, the head 25 receives a signal from the magnetic recording medium 29. Then, the reading/writing processing unit 17 processes this and externally transmits the read data via the interface unit 16.

Here, the head flying height estimation process of the preferred embodiment of the present invention is described below. When writing a signal needed to measure flying height, as in the normal operation, the reading/writing processing unit 17 writes the signal by controlling the writing unit 23 and head 25. Then, a signal read from the head 25 is inputted to a fast Fourier transform (FFT) processing unit 18 via a read unit 24. The FFT processing unit 18 applies Fourier-transform to the read signal and extracts each frequency component included in the read signal. The amplitude of each extracted frequency component is transmitted to a flying height monitor unit 19 and the flying height of the head is estimated according to equation (1) or (2). When the flying height of the head is estimated, the flying height is transmitted to a flying height control unit 21 and a control signal for making the flying height of the head an appropriate value is generated. The control signal is given to the voice coil motor 26 via an energizing control unit 20 and the flying height of the head is modified to an appropriate value.

Figure 6:
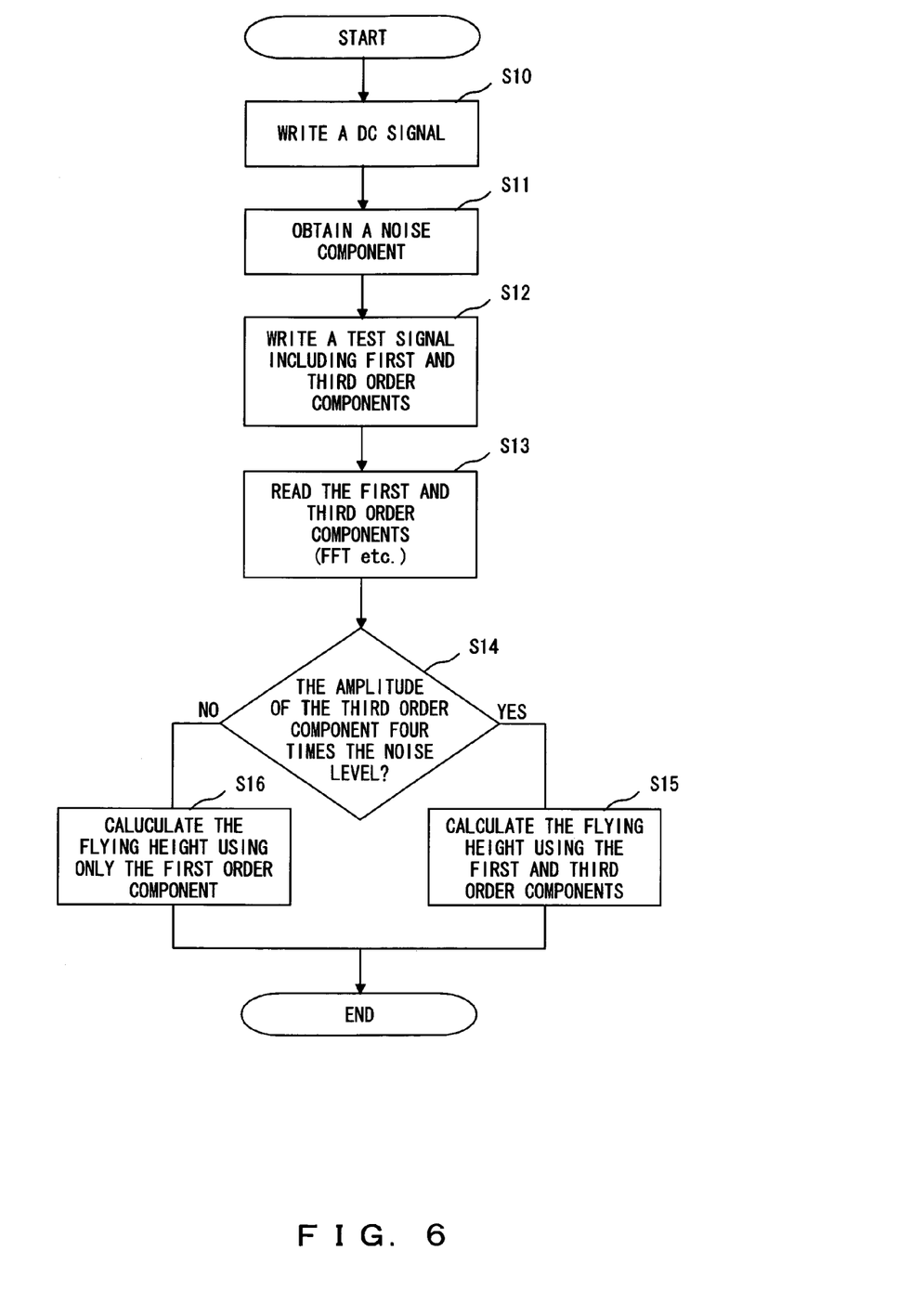
FIG. 6 is a flowchart showing the process of a flying height monitor unit.

FIG. 6 is a flowchart showing the process of a flying height monitor unit.

Firstly, in step S10, a DC signal is written into a magnetic recording medium, which is called "DC erasure". By this, the magnetic recording medium is made to enter a state in which no data is written. In step S11, this DC-erased magnetic recording medium is read and the noise level generated inside the device is obtained. Then, in step S12, a test signal including first order and third order components (generally low and high frequency components) are written into the magnetic recording medium. Then, in step S13, the written test signal is read from the magnetic recording medium and the respective amplitude of the first order and third order components are obtained by Fourier-transform or the like. In step S14, it is determined whether the amplitude level of the third order component is four times or more of the noise level. However, four times is an example in this preferred embodiment, and actually should be appropriately set by a person having ordinary skill in the art. If the determination in step 14 is yes, highly accurate flying height can be estimated even using the third order component. Therefore, in that case, in step S15 the flying height is calculated using both the first order and third order components. Actually, the flying height is calculated according to equation (1). If the determination in step S14 is no, in step S16 the flying height is calculated using only the first order component, since its accuracy degrades if the third order component is used to estimate the flying height. Specifically, the flying height is calculated according to equation (2).

In the above description, if the determination in step S14 is no, the process in step s16 is automatically performed. However, in this case, an alarm can also be issued to an operator.

What is claimed is:

1. A measuring device for measuring flying height of a head in a magnetic storage device, comprising:
   a test signal writing unit for writing a test signal including a plurality of harmonic frequency components;
   a reading unit for reading the written test signal;
   an amplitude acquisition unit for obtaining amplitude of a frequency component from the read test signal; and
   a flying height estimation unit for estimating the flying height of the head without using a frequency component whose amplitude is less than a predetermined value if the amplitude is less than the predetermined value, wherein
   the plurality of harmonic frequency components is comprised of a component with a frequency and a component that is an integer multiple times the frequency, and the frequency component not used to estimate the flying height is the component with a higher frequency of the two frequencies.

2. The measuring device according to claim 1, further comprising:
   an erasure unit for applying direct current (DC) or alternate current (AC) erasure to the magnetic recording medium; and a noise level detection unit for reading the DC/AC-erased magnetic recording medium and detecting its noise level, wherein the predetermined value is determined based on the noise level.

3. The measuring device according to claim 2, wherein the predetermined value is a specific number times the noise level.

4. The measuring device according to claim 1, wherein the plurality of frequency components is comprised of a component with a frequency and a component with a frequency three times the frequency.

5. The measuring device according to claim 1, wherein if there is a frequency component not used to estimate the flying height of the head, an alarm is issued.

6. The measuring device according to claim 1, wherein the test signal is a repetition signal of [111100].

7. The measuring device according to claim 1, wherein the test signal is a repetition signal of [11 . . . ].

8. The measuring device according to claim 7, wherein the test signal is a repetition signal of [11].

9. A measuring method for measuring flying height of a head in a magnetic recording device, comprising:

writing a test signal including a plurality of harmonic frequency components;

reading the written test signal;

obtaining amplitude of a frequency component from the read test signal; and estimating the flying height of the head without using a frequency component whose amplitude is less than a predetermined value if the amplitude is less than the predetermined value, wherein the plurality of harmonic frequency components is comprised of a component with a frequency and a component that is an integer multiple times the frequency, and the frequency component not used to estimate the flying height is the component with a higher frequency of the two frequencies.

10. The measuring method according to claim 9, further comprising:

applying direct current (DC) or alternate current (AC) erasure to the magnetic recording medium; and reading the DC/AC-erased magnetic recording medium and detecting its noise level, wherein the predetermined value is determined based on the noise level.

* * * * *